United States Patent [19]

Graziano et al.

[11] 4,417,006

[45] * Nov. 22, 1983

[54] ORGANOPOLYSILOXANE COATING COMPOSITIONS

[75] Inventors: Frank D. Graziano, Lake Bluff; Edmund J. Kuziemka, Naperville, both of Ill.

[73] Assignee: Material Sciences Corporation, Elk Grove Village, Ill.

[*] Notice: The portion of the term of this patent subsequent to Jan. 18, 2000 has been disclaimed.

[21] Appl. No.: 427,508

[22] Filed: Sep. 29, 1982

Related U.S. Application Data

[63] Continuation-in-part of Ser. No. 271,219, Jun. 8, 1981.

[51] Int. Cl.$^3$ ............................................. C08K 5/15
[52] U.S. Cl. ...................................... 523/435; 523/456
[58] Field of Search ............................... 523/435, 456

[56] References Cited

U.S. PATENT DOCUMENTS

| | | | |
|---|---|---|---|
| 3,786,015 | 1/1974 | Merrill et al. | 528/10 |
| 3,925,276 | 12/1975 | Merrill | 526/279 |
| 4,028,339 | 6/1977 | Merrill | 528/15 |
| 4,369,268 | 1/1983 | Graziano et al. | 523/456 |

*Primary Examiner*—Joseph L. Schofer
*Assistant Examiner*—N. Sarofim
*Attorney, Agent, or Firm*—Mason, Kolehmainen, Rathburn & Wyss

[57] ABSTRACT

Fast-curing resin compositions for coating metal surfaces are described. They comprise a high molecular weight epoxy resin, an etherified resol phenolic resin, a silicone fluid and an organopolysiloxane release resin, with an zinc-iron organometallic curing agent and a solvent. In addition to curing rapidly (one minute or less), the resin compositions are flexible and metal sheets coated therewith can be pressed or bent into various shapes and forms without the resin coating cracking or chipping.

6 Claims, No Drawings

ORGANOPOLYSILOXANE COATING COMPOSITIONS

CROSS REFERENCE TO RELATED APPLICATION

This application is a continuation in part of Ser. No. 271,219 Filed June 8, 1981.

BACKGROUND OF THE INVENTION

Silicone resin compositions have been described which are particularly applicable as release coatings for baking utensils. See for example the Merrill et al U.S. Pat. Nos. 3,786,015, 3,925,276 and 4,028,339. These patents describe silanol-containing silicone resin compositions which are particularly applicable as release agents for cooking and baking utensils. Such coating compositions, however, require extensive heat curing at relatively high temperature for an extended period of time after application to a metal surface. See for example U.S. Pat. No. 4,028,339 (col. 5) which describes the curing of a silanol-containing silicone resin composition at 425° F. for 45 minutes after application to tin-coated steel surfaces. Moreover, such silicone compositions are not particularly flexible and cannot be applied to metal sheets which are thereafter drawn and shaped into cooking utensils such as cups, pans and the like.

OBJECTS OF THE INVENTION

It is an object of this invention to provide silicone coating compositions which cure rapidly on the surfaces of metal objects and utensils with little or no post heating. It is a further object of this invention to provide silicone coating compositions which are flexible at ambient temperature and can be applied to metal surfaces which can thereafter be formed and shaped into various cooking utensils and similar objects without the resin coating cracking or chipping from the metal surface. It is a further object to provide silicone coating compositions which can be applied to metal sheets which are drawn thereafter without the coating composition cracking or breaking away from the metal surface. These and other objects are apparent from and are achieved in accordance with the following disclosure.

SUMMARY OF THE INVENTION

We have discovered that silicone compositions comprising an epoxy-phenolic resin in high boiling solvent which contains a combination of a silanol-containing silicone releasing agent, a silicone fluid and a zinc and-/or iron organometallic curing catalyst form coatings which are rapidly cured in very short time-temperature cycles. These resin formulations can be readily applied to metal surfaces to form thin flexible films which provide excellent release properties for baked goods.

The resin coating, which can be applied directly to any metal surface such as steel, tinmill black plate, tin-free steel, aluminum, tinplate and the like, comprises a bisphenol-epichlorhydrin polymer of molecular weight in the range of 50,000 to 200,000 dissolved in high-boiling solvent such as a Cellosolve ester or a high-boiling ketone such as isophorone, combined with an etherified resol bisphenol-epoxy resin, and containing a combination of silicones comprising a silanol-containing organopolysiloxane resin and an alkylphenylsiloxane fluid. The silicones and combinations thereof are described in U.S. Pat. Nos. 4,028,339 and 3,786,015, the disclosure of which is incorporated herein by reference.

While silicone resin combinations are known to be release agents for food products, the formulations thereof described in prior patents have certain disadvantages. They must be cured at relatively high temperature for rather long periods, and the cured coatings are relatively inflexible so that coated metal strips cannot be drawn or bent without cracking or destroying the coatings. In contrast, the formulations described herein can cure rapidly at ordinary temperature and the resulting coatings, when applied to metal sheets, can be bent, drawn and pressed into desired shapes without the coating cracking or being deformed. These silicone formulations have obvious advantages over those of the prior art.

GENERAL DESCRIPTION OF THE INVENTION

This invention is a coating composition for metal surfaces which comprises a combination of constituents, as follows:

(A) A high molecular weight phenolic-epoxy resin, preferably a bisphenol A-epichlorohydrin resin, although equivalent epoxy resins are also suitable. This resin constitutes about 10% to 25% of the total weight of the composition, and has a molecular weight in the range from 50,000 to 200,000.

(B) An etherified resol-type phenolic resin, preferably a bisphenol-formaldehyde resol resin produced from bisphenol (1.0 mole) and 37% aqueous formaldehyde (1.5 moles) in the presence of an FDA-conforming basic catalyst, such as barium hydroxide. This resin constitutes a minor proportion of the composition, about 1% to 3% by weight.

(C) A silicone fluid composed of a mixture of methylphenylsiloxanes, dimethylsiloxanes and diphenyldimethylsiloxanes. This fluid makes up about 1% to 3% of the composition weight.

(D) An organopolysiloxane release resin containing silanol groups, as described in the Merrill U.S. Pat. No. 4,028,339. It usually forms 12% to 20% of the composition weight. The quantity of the silicone release resin can be varied from twice to fifteen times the weight of the silicone fluid (component C); preferably the ratio is 5:1 to 10:1.

(E) A zinc and/or iron curing catalyst in amount sufficient to cure the composition at room temperature. The preferred catalysts are zinc or iron salts of organic acids, such as aliphatic and cycloaliphatic acids containing six to twenty carbon atoms. Preferred catalysts are iron and zinc octoates and naphthenates, in conventional solvents. The amount of catalyst metal in the formulation, based on the total weight of the silicones (C and D) is 0.01% to 0.25% zinc and 0.001% to 0.12% iron, depending on cure conditions. By using the zinc octoate and iron naphthenate as catalysts, we are able to provide a single package, that is, the catalysts incorporated into the coating at the time of manufacturing of the coating. This provides a five-month stability with no adverse effects where cure and food release properties are concerned; but more important, the release properties are enhanced ten-fold.

(G) Suitable solvents for the constituents and the final composition.

The coating composition can comprise the six components described above and can be applied directly to metal surfaces and cured thereon in time temperature cycles of ½ to one minute at 450°–490° F. It is preferable, however, to combine the polymer constituents (A through D) and appropriate solvents in one solution and maintain the organometallic catalyst in a second solution. The catalyst solution can then be admixed with the polymer solution prior to application.

A less expensive coating procedure, which reduces the amount of expensive organopolysiloxanes required to cover a given area, comprises the application of a base coat to the metal surface, followed by application of the coating composition described above. The base coat is an epoxy-phenolic resin of the general formulation described herein without the silicone components, with a colored pigment if desired, in an organic liquid carrier. It is coated on the metal surface, the carrier evaporated and the coating cured. Thereafter the coating composition described above is applied and cured in a very short time-temperature cycle. By use of the base coat, the quantity of expensive ingredients for a given area is reduced.

In addition to the components (A to E) described above, other materials may be included in the coating composition to achieve certain desirable effects. For instance, silicones may be added for flow control of the compositions to provide smooth coatings on surfaces. Plasticizers may be included to improve film continuity and make the cured coating more flexible in the pan-forming operation. Other phenolic resins may be incorporated in the coating to resist the adverse effects of detergents in pan washing.

EXAMPLE 1

A flexible silicone top coating of wide applicability is produced from the following materials:

| | |
|---|---|
| High molecular weight bisphenol A-epichlorohydrin resin (min. mol. wt. 50,000; hydroxyl no. 0.35; 32% solids in Cellosolve ester) | 464 lbs. |
| Isophorone | 60 lbs. |
| Etherified resol bisphenol-epoxy resin (50% solids in butanol; Araldite DP-139) | 18 lbs. |
| Mixture of methylphenylsiloxanes, dimethylsiloxanes and diphenyl-dimethylsiloxanes (G.E. silicone fluid 81950) | 16 lbs. |
| Silanol-containing methylphenylpolysiloxane resin (Example I, Pat. No. 4,028,339) | 144 lbs. |
| Hydrocarbon solvent | 54 lbs. |
| Xylene | 54.6 lbs. |

The etherified resol bisphenol-epoxy resin is dissolved in the isophorone and the resulting solution is mixed into the high molecular weight bisphenol A-epichlorohydrin resin. Then the two siloxane components are added followed by the hydrocarbon solvent and xylene.

To the resulting resin solution are added 2 lbs. of zinc octanoate and 1.5 lbs. of iron naphthenate in 6 lbs. of aliphatic hydrocarbon solvent and 5.6 lbs. of xylene. The resulting solution is a silicone coating composition which cures rapidly at moderate temperature on metal surfaces and has a pot life of several days. Tinplate coated with this composition can be drawn and shaped into muffin tins without rupturing the resin coating and the muffin tins provide excellent release of baked goods.

EXAMPLE 2

A clear flexible silicone top coating of wide applicability was produced in accordance with the following formula:

| | |
|---|---|
| High molecular weight bisphenol A-epichlorohydrin resin (min. mol. wt. 50,000; hydroxyl no. 0.35; 32% solids in Cellosolve ester) | 464 lbs. |
| Isophorone | 60 lbs. |
| Butyl Cellosolve | 45 lbs. |
| Etherified resol bisphenol-epoxy resin (50% solids in butanol) Defoaming agent (25% Modaflo, Monsanto) | 10 lbs. |
| Mixture of methylphenylsiloxanes, dimethylsiloxanes and diphenyl-dimethylsiloxanes (G.E. silicone fluid 81950) | 10.5 lbs. |
| Silanol-containing methylphenylpolysiloxane resin (Example II, Pat. No. 4,028,339) | 144 lbs. |
| Silicone flow control agent (20% solution of Byk 300 of Byk-Mallinckrodt) | 10 lbs. |
| Hydrocarbon solvent | 54 lbs. |
| Xylene | 54.6 lbs. |
| Zinc octoate (8% solution in xylene) | 4 lbs. |
| Iron naphthenate (6% solution in xylene) | 4 lbs. |

The etherified resol bisphenol-epoxy resin was dissolved in the isophorone and the resulting solution was mixed into the high molecular weight bisphenol A-epichlorohydrin resin. Then the two siloxane components were added, followed by the hydrocarbon solvent and xylene.

To the resulting resin solution was added the zinc octanoate and iron naphthenate in xylene. The resulting formulation was a silicone coating composition which rapidly cured on metal surfaces (60 seconds at a metal temperature of 450° F.) and had a pot life of several months. Tin mill black plate coated with this composition can be drawn and shaped into muffin tins without rupturing the resin coating and the resulting muffin tins provide excellent release of baked goods. The release properties of this formulation were enhanced ten-fold over those of Example 1 of our application Ser. No. 271,219 filed June 8, 1981.

We claim:
1. A fast-curing resin coating composition comprising:
   (i) 10–25 parts of an epoxy resin of molecular weight 50,000 to 200,000,
   (ii) 1–3 parts of an etherified resol phenolic resin,
   (iii) 1–3 parts of a silicone fluid comprised of methylphenylsiloxanes, dimethylsiloxanes and diphenyldemethylsiloxanes,
   (iv) 12–20 parts of an organopolysiloxane release resin prepared by
      (a) agitating a mixture comprising (A) an organohalosilane blend consisting essentially of about 60 mole percent methyltrichlorosilane, about 35 mole percent phenyltrichlorosilane, and about 5 mole percent dimethyldichlorosilane, (B) water, (C) acetone, and (D) a water-immiscible organic solvent, wherein there is present by weight in said mixture per part by weight of (A), about 1.7 to about 10 parts of (B), about 0.2 to about 5 parts of (C), and about 0.3 to about 5 parts of (D); and (b) separating the organic solvent solution of (F) from the resulting hydrolysis mixture of a step (i), wherein (F) is a silanol-containing organopolysiloxane resin having an average ratio of about 1.05 organic radicals per silicon atom, (vi) a catalytic amount of an zinc-iron organometallic curing agent, in a (vii) suitable solvent, all of the parts being parts by weight.

2. A resin composition according to claim 1 wherein the high molecular epoxy resin is a bisphenol A-epichlorohydrin resin.

3. A resin composition according to claim 2 wherein the etherified resol phenolic resin is a bisphenol-formaldehyde resin.

4. A resin composition according to claim 3 wherein the silanol-containing organopolysiloxane release resin is produced from phenyltrichlorosilane.

5. A resin composition according to claim 4 wherein the organopolysiloxane release resin is produced from a silane blend of methyltrichlorosilane, phenyltrichlorosilane and dimethyldichlorosilane.

6. A resin composition according to claim 5 wherein the silanol-containing organopolysiloxane release resin is produced from a silane blend of 526 parts of methyltrichlorosilane, 436 parts of phenyltrichlorosilane and 38 parts of dimethyldichlorosilane.

* * * * *